US010709522B2

(12) United States Patent
Loh et al.

(10) Patent No.: US 10,709,522 B2
(45) Date of Patent: Jul. 14, 2020

(54) REACTIVE MICRO APPLICATOR WITH METAL-CONTAINING ADDITIVES FOR USE IN DENTAL ADHESIVES

(71) Applicant: HERAEUS KULZER GMBH, Hanau (DE)

(72) Inventors: Waltraut Loh, Frankfurt (DE); Astrit Kastrati, Wöllstadt (DE); Bärbel Quinque, Friedberg-Ockstadt (DE); Regina Eppinger, Weilburg (DE); Marcus Hoffmann, Usingen (DE)

(73) Assignee: KULZER GMBH, Hanau (DE)

( * ) Notice: Subject to any disclaimer, the term of this patent is extended or adjusted under 35 U.S.C. 154(b) by 0 days.

(21) Appl. No.: 15/314,198

(22) PCT Filed: May 27, 2015

(86) PCT No.: PCT/EP2015/061692
§ 371 (c)(1),
(2) Date: Nov. 28, 2016

(87) PCT Pub. No.: WO2015/181227
PCT Pub. Date: Dec. 3, 2015

(65) Prior Publication Data
US 2017/0189138 A1   Jul. 6, 2017
US 2018/0110585 A9   Apr. 26, 2018

(30) Foreign Application Priority Data
May 28, 2014 (DE) .................... 10 2014 107 518

(51) Int. Cl.
A61C 3/00 (2006.01)
A46D 1/00 (2006.01)
A46B 15/00 (2006.01)
A61C 5/62 (2017.01)
A46B 11/00 (2006.01)
A46D 3/00 (2006.01)
A61C 19/00 (2006.01)

(52) U.S. Cl.
CPC .......... *A61C 3/005* (2013.01); *A46B 11/0072* (2013.01); *A46B 15/0016* (2013.01); *A46D 1/0207* (2013.01); *A46D 3/00* (2013.01); *A61C 5/62* (2017.02); *A61C 19/005* (2013.01); *A46B 2200/1066* (2013.01); *A46B 2200/202* (2013.01)

(58) Field of Classification Search
CPC .......... A61C 3/005; A61C 5/62; A61C 19/005
See application file for complete search history.

(56) References Cited

U.S. PATENT DOCUMENTS

| | | | | |
|---|---|---|---|---|
| 3,715,334 A * | 2/1973 | Karstedt | ................ | A61K 6/083 525/475 |
| 3,814,730 A * | 6/1974 | Karstedt | ............. | C07F 15/0086 525/474 |
| 4,921,851 A * | 5/1990 | Kishimoto | ........... | C07D 501/00 514/202 |
| 5,407,973 A | 4/1995 | Hasegawa et al. | | |
| 6,288,138 B1 * | 9/2001 | Yamamoto | ........... | A61K 6/0023 523/118 |
| 6,376,568 B1 * | 4/2002 | Baudin | ...................... | C08F 2/50 522/6 |
| 6,485,709 B2 | 11/2002 | Banerjee et al. | | |
| 6,855,749 B1 * | 2/2005 | Yadav | .................... | B01J 12/005 523/105 |
| 7,740,476 B2 | 6/2010 | Allred et al. | | |
| 8,084,514 B2 * | 12/2011 | Anton | .................. | A61K 6/0017 433/228.1 |
| 2002/0156152 A1 * | 10/2002 | Zhang | .................. | A61K 6/0017 523/115 |
| 2003/0213931 A1 * | 11/2003 | Baudin | ................. | C07C 69/738 252/62 |
| 2005/0119435 A1 * | 6/2005 | Baudin | ..................... | C08F 2/46 528/25 |
| 2008/0286713 A1 * | 11/2008 | Nanda | ................ | A46B 15/0002 433/29 |
| 2009/0005469 A1 * | 1/2009 | Craig | ................... | A61K 6/0017 522/78 |
| 2009/0092563 A1 * | 4/2009 | Allred | .................... | A61C 19/06 424/53 |
| 2014/0138864 A1 * | 5/2014 | Plaumann | ............ | A61K 6/0008 264/19 |

(Continued)

FOREIGN PATENT DOCUMENTS

DE    698 29 257 T2    1/2006
DE  11 2008 002 651 T5  10/2010

(Continued)

OTHER PUBLICATIONS

International Search Report dated Jul. 16, 2015.
Platinum black, Wikipedia, downloaded on Apr. 17, 2019, from the website wikipedia.org.

*Primary Examiner* — Yogesh P Patel
*Assistant Examiner* — Stephen R Sparks
(74) *Attorney, Agent, or Firm* — Norris McLaughlin, P.A.

(57) ABSTRACT

The invention relates to dental micro-applicators having a body with a distal and a proximal end, whereby, on the proximal end, an application aid is provided, at least in part, with at least one additive selected from metals, metal-containing compounds, and organometallic compounds for affecting the polymerisation of dental materials, as well as a method for the production thereof and a kit comprising the applicator and a dental adhesive.

23 Claims, No Drawings

(56) References Cited

U.S. PATENT DOCUMENTS

2015/0147718 A1* 5/2015 Khakpour ................ A61C 5/02
433/81
2015/0342839 A1* 12/2015 Montgomery ....... A61K 6/0017
424/78.35

FOREIGN PATENT DOCUMENTS

DE 10 2013 008 176 A1 4/2014
KR 100 854 960 B1 8/2008

* cited by examiner

REACTIVE MICRO APPLICATOR WITH METAL-CONTAINING ADDITIVES FOR USE IN DENTAL ADHESIVES

This application is a 371 of PCT/EP2015/061692, filed May 27, 2015, which claims foreign priority benefit under 35 U.S.C. § 119 of German Patent Application No. 10 2014 107 518.8, filed May 28, 2014, the disclosures of which are incorporated herein by reference.

The invention relates to a dental micro-applicator having a body, whereby the body comprises a distal and a proximal end, and, on the proximal end, an application aid is provided, at least in part, with at least one additive selected from metals, metal-containing compounds, and organometallic compounds for affecting the polymerisation of dental materials, as well as a method for the production thereof and a kit comprising the applicator and a dental adhesive.

Numerous bondings and primer combinations are known for improvement of the adhesion of dental materials to teeth. The adhesives of recent generation comprise one-component self-etching adhesives. To provide for good adhesion to the teeth, a large adhesion surface that wets well must be provided. The adhesive itself must be quite runny, comprise good wetting properties and cure very rapidly in order to minimise any potential contact with moisture and ensuing reduced adhesion.

Accordingly, self-etching adhesives are known that combine the steps of acid etching and subsequent application of the adhesive into one step. The acid-containing adhesive system dissolves the smear layer and exposes the underlying dentine or dissolves the smear layer only partially to make it permeable for ingredients of the adhesive. The infiltration of the monomers into the hard substance of the tooth takes place simultaneously. In case of enamel, the acid-containing adhesive systems generate an etching pattern that resembles phosphoric acid etching. The solvent required for infiltration is removed with an air blower and the adhesive is cured and/or radiation-cured.

It was the object of the invention to improve and/or accelerate the curing of polymerisable dental materials. Moreover, the shear bond strength of the dental materials was to be improved further. It was another object of the invention to provide an aid and a kit by means of which the polymerisation and, preferably by this means, the curing and preferably the adhesion of dental materials to dentine and/or to enamel can be improved. It was another object to provide that, preferably, no further working steps at user premises are required to accelerate the polymerisation and, preferably, the curing, and preferably to improve the adhesion to the tooth. Moreover, the treatment time was to be shortened advantageously.

The objects are met by a dental micro-applicator according to claim 1, by the method according to claim 11 for production of the applicator as well as by the kit according to claim 19 comprising the applicator as well as by the inventive use according to claim 24. Preferred embodiments are described in the sub-claims and illustrated, in detail, in the description.

The objects of the invention are met by a micro-applicator that is provided with at least one additive, which preferably comprises catalytically active platinum, the applicator preferably comprises platinum sponge as well as, optionally, at least one further additive as well as, optionally, at least one excipient. Alkaline additives capable of increasing the pH value of the self-etching adhesive after the etching step in delayed manner have proven valuable as further additive. For example disintegrants (disintegration agents) or film-forming agents such as cellulose, micro-crystalline cellulose, can be used as excipients.

The object of the invention is a dental micro-applicator having a body, in particular having an elongated rod-shaped body, with a distal and a proximal end, whereby an application aid is provided on the proximal end, whereby the application aid comprises at least on its outer surface, in particular, optionally, on the inner surface, at least in part, at least one additive selected from metals, metal-containing compounds, and organometallic compounds for affecting the polymerisation, in particular for accelerating the polymerisation and/or for improving the chemical resistance of the polymerised dental material. It is particularly preferred in this context that a radical polymerisation is being affected and/or accelerated. According to the invention, the polymerisation of dental adhesives, such as self-etching adhesives, in particular of dental monomers with at least one acid group, preferably of dental adhesives with a pH value below pH=7, preferably with a pH of 6 to 1, preferably of 5 to 1, is being accelerated. The monomers for radical polymerisation having an acid group in the molecule, also called acid component, comprise polymerisable monomers with at least one, preferably multiple, ethylene groups and at least one carboxylic acid, carboxylic acid anhydride, phosphoric acid and/or sulfonic acid group, as disclosed in more detail below.

Preferably, the adhesion of dental materials is improved and/or the chemical compatibility with further dental materials is improved. Preferably, the applicator can comprise a mixture of the additives specified above. Advantageously, the applicator comprises 1 to 10 different additives, mixtures of said additives, activators and/or excipients, in particular 1, 2, 3, 4, 5, 6, 7, 8, 9 or 10.

An improvement of the adhesion values has been demonstrated for a particularly preferred micro-applicator that was provided with platinum, preferably powdered platinum. To produce the applicator, a commercial applicator was treated with an aqueous nano-platinum suspension and dried. With regard to the applicator thus treated, a beneficial effect in the course of a pretreatment of the tooth surface in combination with Heraeus iBOND® Self Etch was demonstrated. Compared to the reference experiments with iBOND® Self Etch using a commercial applicator (treated without platinum), statistically significantly higher results for the shear bond strength when bonded to enamel were obtained when a platinum-treated applicator was used. The shear bond strength results on enamel were increased by 10 to 20% with said applicators. Accordingly, the total adhesion thus attained was improved to reach a thus far unattainable range.

It is particularly preferred that the applicator or the application aid is at least in part impregnated with nano-particulate platinum, in particular on its outer surface and/or on at least one inner surface. Also preferably, the nano-particulate platinum has a particle size of less than or equal to 10 nm, in particular the nano-particulate platinum is platinum sponge. Particularly preferred particle sizes of the platinum comprise particles of less than or equal to 50 nm, less than or equal to 10 nm, 7 nm, approx. 5 nm with +/−2 nm. A platinum sponge is particularly preferred. Preferably, the purity of the platinum is more than or equal to 90% by weight of a platinum content, in particular more than or equal to 95% by weight, 98% by weight, 99% by weight, 99.5% by weight, further preferably more than or equal to 99.7% by weight, 99.8% by weight, 99.9% by weight.

According to a preferred alternative, applicators comprising at least one further additive in addition to a first additive, in particular an activator, are provided. In this context, a combination of platinum and a salt of a sulfinic acid, in particular an alkaline salt of toluenesulfinic acid, is a preferred combination of additives on the applicators. Using this combination, it is feasible to have the application of compounds that cannot be stored or are not compatible with a dental composition still take place in a one-step application.

Accordingly, applicators were impregnated with platinum. The resulting dried applicators were used to apply iBOND® Self Etch to teeth, in particular into the cavity of said teeth, particularly preferably in the context of a caries treatment. Samples of iBOND®, which were applied with untreated applicators, served as reference. The shear bond strength on enamel was improved by 10-20% with the applicators comprising platinum as compared to the values obtained with applicators with no additives. The applicators according to the invention allow the adhesion of the dental materials to be improved further using an application that is unchanged for the user.

The beneficial effect of the additive on the improvement of the shear bond strength is concentration-dependent, which is not uncommon for catalyst systems. Since iBOND® Self Etch as such predominantly causes cohesive fractures in the hard substance of the tooth in shear bond strength tests on dentine with commercial applicators, it was not feasible to demonstrate further improvement of the adhesion by the additive-provided applicators using this method. The control values for iBOND® Self Etch on dentine are already at the upper limit of the range, in which the shear bond strength is a suitable test method.

According to a preferred embodiment of the invention, at least one additive has a particle size of less than or equal to 100 nm, in particular more than or equal to 1 nm. Alternatively or in addition, at least one additive is present in nano-particulate form, in particular having a particle size of less than or equal to 500 nm to more than or equal to 1 nm, preferably less than or equal to 250 to 5 nm, particularly preferably less than or equal to 100 to 5 nm. Advantageously, the at least one additive comprises at least one nano-particulate metal and/or at least one metal-containing compound, preferably one additive comprises an alkaline component, whereby the particle size thereof preferably is less than or equal to 100 nm, such as from 100 to 1 nm.

According to an embodiment, a micro-applicator can comprise a body having a distal and a proximal end, whereby an application aid is provided on the proximal end and, preferably, a hand grip element or a hand grip end is provided on the distal end.

A preferred applicator preferably consists of a polymer, in particular of an inert polymer, which preferably is inert with respect to dental materials, such as self-etching adhesives, in particular the body of the applicator consists of said polymers. Preferred polymers comprise thermoplastic polymers, in particular comprising PE, PP, HDPE, LDPE, porous expanded polypropylene (PEPP) and/or expanded polypropylene (EPP). The applicator preferably is made of a flexible and, preferably, inert material, which, more preferably, can be wetted well with dental materials.

Accordingly, it is preferred for the applicator to comprise, on the proximal end of the body, an application aid that is at least selected from a) filament, brush, sponge, flakes, comb, ball, paintbrush, spatula, mixing pad, textile material and/or porous means, in particular the additives can be present incorporated or embedded in the porous means to be released upon contact with a dental polymerisable composition. Advantageous applicators are made of a thermoplastic polymer and/or a polymer that is chemically resistant to solvents. Preferred application aids comprise a multitude of filaments. It can be preferred that the applicator comprises a rod-shaped and solid material body; in particular the body of the applicator comprises no inner hollow space. Also preferably, the body is at least partially cylindrical and of solid material and/or conical and of solid material. According to the invention, the applicator is a micro-applicator having a body with a distal and a proximal end, whereby an application aid is provided on the proximal end and, preferably, a hand grip element or a hand grip end is provided on the distal end and the body of the applicator is rod-shaped and of solid material.

According to a particularly preferred embodiment, the application aid of the applicator is provided with at least one catalytically active metal or at least one catalytically active organometallic compound. Preferably, the metals are selected from the metals of the platinum group. Particularly preferably, the at least one catalytically active metal or the at least one catalytically active organometallic compound is selected from iron, cobalt, nickel, ruthenium, rhodium, palladium, osmium, iridium, platinum, silver, copper, tin, and zinc, and the organometallic compound is selected from complexes of the metals specified above.

Moreover, according to the invention, the applicators can comprise at least one additive or a mixture of said additives selected from at least one metal-containing compound selected from alkaline salts, alkaline earth salts; such as inorganic salts, alkali metal hydroxides, alkaline earth metal hydroxides, organic alkaline salts, organic alkaline earth salts; basic metal oxides, base-forming agents, such as aluminium oxide, zinc oxide, copper oxides, etc.; and metal-containing buffers. Further examples comprise $Ca(OH)_2$, Nano-HAP, NaOH. The alkaline additives enable an increase of the pH value, advantageously the pH value can be increased by more than or equal to 0.2, 0.5 or 1.0, whereby neutralisation upon the use with acidic dental materials is particularly preferred.

The compounds stated below and applied to applicators are considered to be an excipient: Carboxylic acids, salt of a carboxylic acid, fruit acid, buffer and/or base. Said compounds can have a stabilising effect on the suspension for production of the applicators and can be impregnated onto the applicators. Introduced by means of the applicator, they can act as a buffer in a self-etching dental material.

The object of the invention also includes applicators having at least one additive or a mixture of said additives comprising bases, base-releasing compounds selected from metals, metal-containing compounds, and organometallic compounds comprising alkali hydroxide, alkaline earth hydroxide, neutral bases, anionic bases, cationic bases, metal oxide, base-forming agents, such as CaO, sodium hydrogencarbonate, aluminium hydroxide, or with at least one further additive comprising organic bases and/or ammonia.

The buffers can be selected, inter alia, from acetic acid-acetate buffer (pH 3.7 to 5.7), phosphate buffer (pH 5.4 to 8.0), ammonia buffer (pH 8.2 to 10.2), citric acid buffer or citrate buffer, TRIS: Tris(hydroxymethyl)-aminomethane (pH 7.2 to 9.0), HEPES: 4-(2-hydroxyethyl)-1-piperazinethanesulfonic acid (pH 6.8 to 8.2), HEPPS: 4-(2-Hydroxyethyl)-piperazine-1-propanesulfonic acid (pH 7.3 to 8.7), MES: 2-(N-morpholino)ethanesulfonic acid (pH 5.2 to 6.7), barbital-acetate buffer according to Michaelis (pH 2.6 to 9.2) or a lactic acid buffer system.

A compound serving as activator or as further additive that can be applied to the applicator can comprise the following compounds or mixtures: aromatic organic acid and/or a salt thereof, such as, for example, an organic sulfinic acid and/or a salt thereof or barbituric acid and/or a derivative thereof. The organic sulfinic acid or a salt thereof is sulfinic acid or a common alkali metal salt, alkaline earth metal salt, amine salt or ammonium salt of sulfinic acid. A lithium, sodium, potassium salt or the like can be selected as alkali metal salts. Magnesium, calcium, strontium or a barium salt or the like can be selected as alkaline earth metal salt. A conceivable amine salt is a primary amine salt such as, for example, methylamine, ethylamine, propylamine, butylamine, aniline, toluidine, phenylene diamine or xylylene diamine; a secondary amine salt such as, for example, dimethylamine, diethylamine, dipropylamine, dibutylamine, piperidine, N-methylaniline, N-ethylaniline, diphenylamine or N-methyltoluidine; or a tertiary amine such as, for example, trimethylamine, triethylamine, pyridine, N,N-dimethylaniline, N,N-di(hydroxyethyl)aniline, N,N-diethylamine, N,N-dimethyltoluidine, N,N-diethyltoluidine or N,N-(hydroxyethyl)toluidine. Typical ammonium salts comprise an ammonium, tetramethylammonium, tetraethylammonium, tetrapropylammonium salt or trimethylbenzylammonium salt.

Preferred examples of an organic sulfinic acid include alkanesulfinic acids such as, for example, ethanesulfinic acid, propanesulfinic acid, hexanesulfinic acid, octanesulfinic acid, decanesulfinic acid, and dodecanesulfinic acid; alicyclic sulfinic acids such as, for example, cyclohexanesulfinic acid.

The activator can be selected from the following aromatic organic acids and/or a salt, in the kit selected from an aromatic organic acid and/or a salt thereof such as, for example, an organic sulfinic acid and/or a salt thereof or barbituric acid and/or a derivative thereof. Conceivable salts of sulfinic acid include the above-mentioned alkaline or alkaline earth salts, amine as well as ammonium salts.

Advantageous sulfinic acids comprise, as organic sulfinic acid, an alkanesulfinic acid such as, for example, ethanesulfinic acid, propanesulfinic acid, hexanesulfinic acid, octanesulfinic acid, decanesulfinic acid, and dodecanesulfinic acid; alicyclic sulfinic acids such as, for example, cyclohexanesulfinic acid and cyclooctanesulfinic acid; as well as aromatic sulfinic acids such as, for example, benzenesulfinic acid, o-toluenesulfinic acid, p-toluenesulfinic acid, ethylbenzenesulfinic acid, decylbenzenesulfinic acid, dodecylbenzenesulfinic acid, chlorobenzenesulfinic acid, and naphthalinesulfinic acid.

Preferred examples of the organic sulfinates comprise lithiumbenzenesulfinate, sodiumbenzenesulfinate, potassiumbenzenesulfinate, magnesiumbenzenesulfinate, calciumbenzenesulfinate, strontiumbenzenesulfinate, bariumbenzenesulfinate, butylaminebenzenesulfinate, anilinebenzenesulfinate, toluidinebenzenesulfinate, phenylendiaminebenzenesulfinate, diethylaminebenzenesulfinate, diphenylaminebenzenesulfinate, triethylaminebenzenesulfinate, ammoniumbenzenesulfinate, tetramethylammoniumbenzenesulfinate, and trimethylbenzylammoniumbenzenesulfinate. Moreover, also conceivable are lithium-o-toluenesulfinate, sodium-o-toluenesulfinate, potassium-o-toluenesulfinate, calcium-o-toluenesulfinate, cyclohexylamine-o-toluenesulfinate, aniline-o-toluenesulfinate, ammonium-o-toluenesulfinate, tetraethylammonium-o-toluenesulfinate, lithium-p-toluenesulfinate, sodium-p-toluenesulfinate, potassium-p-toluenesulfinate, p-toluenesulfinic acid, barium-p-toluenesulfinate, ethylamine-p-toluenesulfinate, toluidine-p-toluenesulfinate, N-methylaniline-p-toluol-sulfinate, pyridine-p-toluenesulfinate, ammonium-p-toluenesulfinate, tetramethylammonium-p-toluenesulfinate, sodium-naphthalinesulfinate, strontium-naphthalinesulfinate, triethylamine-naphthalinesulfinate, N-methyltoluidine-naphthalinesulfinate, ammonium-naphthalinesulfinate, trimethylbenzyl-ammonium-naphthalinesulfinate and the like for use as organic sulfinate. Sodium-toluenesulfinate is particularly preferred.

Likewise, the at least one activator can be selected from a barbituric acid derivative. The activator in the kit can be selected from a barbituric acid derivative. The barbituric acid derivatives are advantageously selected from 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propyl-barbituric acid, 5-ethylbarbituric acid, 5-propylbarbituric acid, 5-butylbarbituric acid, 5-methyl-1-butylbarbituric acid, 1-benzyl-5-phenylbarbituric acid, 1-cyclohexyl-5-ethylbarbituric acid or an alkali metal salt thereof. Preferred concentrations of the barbituric acid derivative range from 0.1-10% by weight based on the total composition of the dental adhesive.

The above-mentioned activators, such as aromatic organic acids or barbituric acid derivatives, are preferably dissolved alone under neutral or alkaline conditions. The impregnation of the applicator can take place by means of dipping, spraying as well as any other method common to a person skilled in the art. Spraying a tacky powder is feasible just as well. Depending on the planned application, the at least one additive can be applied together with further excipients that affect the time of release of the at least one additive. This can be a delaying or an accelerating, for example by adding disintegration agents.

Further additives, which are also suitable and can be provided on the activator additionally or alternatively, comprise an excipient, activator and/or at least one further additive, whereby the excipients comprise carboxylic acid, salt of a carboxylic acid, fruit acid, buffer, hygroscopic compounds, in particular hygroscopic salts, such as ($CaCl_2$), and/or the at least one additional further additive is selected from bases and bases-releasing compounds.

Depending on the stability of the additives, the applicators are packaged individually or together in airtight and/or light-protected manner. Preferably, the applicators are packaged in a blister, etc., that protects from light and/or is airtight.

Another object of the invention is a method for producing a dental micro-applicator, as well as an applicator obtainable according to said method, in particular an applicator as described above, in which
(i) a dental micro-applicator having a body with a distal and a proximal end with an application aid on the proximal end
(ii) the application aid is contacted to with at least one additive selected from metals, metal-containing compounds, and organometallic compounds for affecting the adhesion of dental materials.

Advantageously, the at least one additive is provided in (ii) a suspension, dispersion, paste, solution, spray drying or the at least one additive is provided in the form of a powder.

Moreover, it is preferred to contact the application aid with a nano-particulate additive in step (ii). It is preferred in this context for the additive, in particular the metallic additive, particularly preferably platinum, to preferably be present having a particle size of less than or equal to 500 nm to more than or equal to 1 nm, preferably less than or equal to 250 to 5 nm, particularly preferably less than or equal to 100 to 5 nm or of 50 to 2 nm. Advantageously, at least one nano-particulate metal and/or at least one nano-particulate metal-containing compound is being provided. Preferably, an alkaline component, in particular one having a particle size of less than or equal to 100 nm, can be used. As mentioned above, the at least one additive for contacting preferably has a particle size of less than or equal to 100 nm and is present, in particular, in a suspension. Alternatively, the additives can be used in the method in the form of a solution, such as aqueous solution, or a mixture of solvent/water. Particularly preferably, the nano-particulate metal is used in a suspension in (ii) in the method.

According to a particularly preferred variant of the method, the metal is used in a suspension at a content, based on the total composition of the suspension, of 1.0 to $1.0 \cdot 10^{-8}\%$ by weight, in particular of $1.0 \cdot 10^{-1}$ to $1.0 \cdot 10^{-8}\%$ by weight, preferably of $1.0 \cdot 10^{-3}$ to $1.0 \cdot 10^{-5}$ by weight, particularly preferably of $1.0 \cdot 10^{-3}$ to $2.5 \cdot 10^{-4}\%$ by weight, according to the invention $1.0 \cdot 10^{-3}$ to $2.2 \cdot 10^{-3}\%$ by weight.

According to the invention, in the method for producing the applicator, it is preferred to contact an applicator with the (ii) application aid with at least one additive comprising at least one metal-containing compound that is selected from alkaline salts, alkaline earth salts, inorganic salts of alkali metals, inorganic salts of alkaline earth metals; in particular, alkali metal hydroxides, alkaline earth metal hydroxides; organic alkaline salts, organic alkaline earth salts, basic metal oxides, base-forming agents, and metal-containing buffers.

It is preferable to dry the impregnated applicators.

An other object of the invention is a kit comprising an a) applicator as described above or obtainable by a method according to the invention, and b) a dental adhesive, in particular a polymerisable dental adhesive. The kit preferably comprises a) an applicator comprising at least one additive selected from metals, metal-containing compounds, and organometallic compounds for affecting the adhesion of dental materials, in particular at least platinum, in particular platinum sponge. Preferably, the applicator in the kit comprises further additives such as an activator such as a sulfinic acid or a salt of a sulfinic acid and/or a base. Additives according to the invention are preferably self-etching dental adhesives.

Preferably, the dental adhesive comprises at least A) one radically polymerisable monomer having an acid group in the molecule, B1) optionally, a photo-sensitiser and/or, optionally, B2) a peroxide, C) a water-miscible solvent such as alcohol, ketone, ester, ketal, isopropylidene glycerol, ethanol, preferably acetone; and D) water.

Moreover, the kit can comprise E) at least one radically polymerisable monomer without an acid group, which preferably is not or poorly soluble in water (less than 2 g/100 ml $H_2O$).

The monomers for radical polymerisation having an acid group in the molecule according to A), also called acid component, comprise polymerisable monomers with at least one, preferably multiple, ethylene groups and at least one carboxylic acid, carboxylic acid anhydride, phosphoric acid group and/or sulfonic acid group.

Mono-functional polymerisable monomers with a carboxylic acid group or a carboxylic acid anhydride group in the molecule can be selected from mono-carboxylic acids, di-carboxylic acids, tri-carboxylic acids, tetra-carboxylic acids, poly-carboxylic acids, and anhydrides thereof. Preferred compounds can be carboxylic acids and/or anhydrides such as maleic acid, p-vinylbenzoic acid, 11-(meth)acryloyloxy-1,1-undecandicarboxylic acid (MAC-10), 1,4-di(meth)acryloyloxyethylpyromellithic acid, 6-(meth)acryloyloxyethyl-naphthalene-1,2,6-tricarboxylic acid, 4-(meth) acryloyloxymethyltrimellithic acid and anhydrides thereof, 4-(meth)acryloyloxyethyltri mellithic acid and anhydride thereof, 4-(meth)acryloyloxybutyltrimellithic acid and anhydride thereof, 4-[2-hydroxy-3-(meth)acryloyloxy]butyltrimellithic acid and anhydride thereof, 2,3-bis(3,4-dicarboxybenzoyloxy)propyl(meth)acrylate, 2-, 3-, or 4-(meth)acryloyloxybenzoic acid, N-O-di(meth)acryloyloxytyrosine, O-(meth)acryloyloxytyrosine, N-(meth)acryloyloxytyrosine, N-(meth)acryloyloxyphenylalanine, N-(meth)acryloyl-p-amine-benzoic acid, N-(meth)acryloyl-O-aminebenzoic acid, adduct of glycidyl(meth)acrylate and N-phenylglycine or N-tolylglycine, 4-[(2-hydroxy-3-(meth)acryloyloxypropyl) amino] phthalic acid, 3- or 4-[N-methyl-N-(2-hydroxy-3-(meth)acryloyloxypropyl)amino]phthalic acid, (meth)acryloylaminosalicylic acid and (meth)acryloyloxysalicylic acid. 11-(Meth)acryloyloxy-1,1-undecanedicarboxylic acid (MAC-10) and 4-methacryloyloxyethyltrimellithic acid (4-MET) or the anhydride thereof (4-META) are preferred. Poly-functional polymerisable monomers with at least two carboxyl groups in the molecule that can be used as component (A) can comprise di-carboxylic acids, tri-carboxylic acids, tetra-carboxylic acids and derivatives thereof such as, for example, an addition product of 2-hydroxyethyl-(meth)acrylate and pyromellithic acid dianhydride (PMDM), an addition reaction product of 2 mol hydroxyethyl-(meth)acrylate and 1 mol maleic acid anhydride or 3,3',4,4'-benzophenonetetracarboxylic acid dianhydride (BTDA) or 3,3',4,4'-biphenyltetracarboxylic acid dianhydride, and 2-(3,4-dicarboxybenzoyloxy)1,3-di(meth)acryloyloxypropane.

Polymerisable monomers having at least one phosphoric acid group in the molecule comprise, for example, 2-(meth)acryloyloxyethyl acid phosphate, 2- and 3-(meth)acryloyloxypropyl acid phosphate, 4-(meth)acryloyloxybutyl acid phosphate, 6-(meth)-acryloyloxyhexyl acid phosphate, 8-(meth)acryloyloxyoctyl acid phosphate, 10-(meth)-acryloyloxydecyl acid phosphate, 12-(meth)acryloyloxydodecyl acid phosphate, bis({2-(meth)-acryloyloxyethyl} acid phosphate, bis {2 or 3-(meth)acryloyloxypropyl}-acid phosphate, 2-(meth)acryloyloxyethylphenyl acid phosphate, 2-(meth)acryloyloxyethyl-p-methoxyphenyl-acid phosphate and the like. The phosphoric acid in these compounds can be replaced by a thiophosphoric acid group.

Among the monomers specified above, the following are preferred: 2-(meth)acryloyloxyethyl-phenyl acid phosphate and 10-(meth)acryloyloxydecyl acid phosphate. The monomers having a phosphoric acid group can be used individually or in combination.

Polymerisable monomers having a sulfonic acid group in the molecule can comprise 2-sulfoethyl(meth)acrylate, 2- or 1-sulfo-1- or -2-propyl(meth)acrylate, 1- or 3-sulfo-2-butyl-(meth)acrylate, 3-bromo-2-sulfo-2-propyl(meth)acrylate, 3-methoxy-1-sulfo-2-propyl(meth)-acrylate, 1,1-dimethyl-2-sulfoethyl(meth)acrylamide, and 2-methyl-2-(meth)acrylamidpropanesulfonic acid, whereby 2-methyl-2-(meth)acrylamidpropanesulfonic acid is preferred.

The polymerisable monomer A) can comprise an acid group that is present as a salt such as, for example, as monovalent or polyvalent metal salt or ammonium salt. However, it is preferred in this context that the monomer A) acts as an acid when it is used in conjunction with another acidic compound and is contacted to the other acidic compound. The preceding components A) can be used individually or in combination with each other.

Preferred components B1) and/or B2) optionally comprise a photo-sensitiser as B1) and/or optionally comprise a peroxide as B2).

Preferred components B1) comprise an alpha-ketocarbonyl compound or an acylphospine oxide compound. Actually preferred are alpha-diketone, alpha-ketoaldehyde, alpha-ketocarboxylic acid, alpha-ketocarboxylate. Actually preferred are alpha-diketones, such as, for example, diacetyl, 2,3-pentadione, 2,3-hexadione, benzyl, 4,4'-dimethoxybenzyl, 4,4'-diethoxybenzyl, 4,4'-oxybenzyl, 4,4'-dichlorobenzyl, 4-nitrobenzyl, alpha-naphthyl, camphor quinone, camphor quinone sulfonic acid, camphor quinone carboxylic acid, and 1,2-cyclohexanedione; alpha-ketoaldehydes, such as, for example, methylglyoxal and phenylglyoxal; and others, such as, for example, pyruvic acid, benzoylformic acid, phenylpyruvic acid, methylpyruvate, ethylbenzoylformate, methylphenylpyruvate, and butylphenylpyruviate. Alpha-diketones are particularly preferred due to their stability, as are diacetyl, benzyl, and camphor quinone.

Moreover, component B1) comprises benzoyldimethoxyphosphine oxid, benzoylethoxyphenylphosphine oxide, 2-methylbenzoyldiphenylphosphine oxide, 2,4,6-trimethylbenzoyldiphenylphosphine oxide and the derivatives thereof. All photo-active compounds can be used individually or as a mixture.

Compounds such as diacetyldiperoxide, dipropylperoxide, dibutylperoxide, dicaprylperoxide, dilaurylperoxide, benzoylperoxide (BPO), p,p'-dichlorobenzoylperoxide, dimethoxybenzoylperoxide, p,p'-dimethylbenzoylperoxide, and p,p'-dinitrodibenzoylperoxide; and inorganic peroxides, such as, for example, ammonium persulfate, potassium persulfate, potassium chlorate, potassium bromate, and potassium perphosphate can be used as peroxide B2). BPO is preferred.

Alcohol, ketone, ester, ketal, isopropylidene glycerol, such as ethanol, but preferably acetone, can be used as component C), a water-miscible solvent.

Component C) according to the invention is a water-soluble organic solvent. It serves for homogeneous dissolution or dispersion of any of the above-mentioned components, whereby the solvent is to be inert to the components and, advantageously, is volatile. Higher alcohols can be used as well, such as, for example, ethylene glycol, propylene glycol, and glycerol.

Component E) preferably comprises at least one monomer for radical polymerisation devoid of an acid group, which, in particular, is not or poorly soluble in water. Preferred monomers for radical polymerisation devoid of an acid group that are different from component A) comprise aromatic vinyl compounds, such as, for example, styrene and divinylbenzende, vinylester such as for example vinylacetate; aliphatic esters of (meth)acrylic acid, such as, for example, methyl(meth)acrylate, ethyl(meth)acrylate, propyl (meth)acrylate, butyl(meth)acrylate, pentyl(meth)acrylate, hexyl(meth)acrylate, neopentylglycoldi(meth)acrylate, and trimethylolpropane-tri(meth)acrylate; aromatic esters such as, for example, phenyl(meth)acrylate; aromatic (meth)acrylates such as, for example, 2-hydroxy-3-phenoxypropyl (meth)acrylate, an adduct of 1 mol bisphenol A and 2 mol glycidyl(meth)acrylate (Bis-GMA), a condensate of 1 mol of an addition polymer made of bisphenol A with glycidylether and 2 mol (meth)acrylic acid, and a condensate of 1 mol of an adduct of bisphenol A with ethylene oxide and 2 mol (meth)acrylic acid (number of addition chains of ethylene oxide m+n=2.6); urethane-bond-containing methacrylates such as, for example, 2-(meth)acryloyloxy-ethylisocyanate and an adduct (UDMA) made of 2 mol hydroxyethyl(meth)acrylate with 1 mol 2,2,4-(or 2,4,4-) trimethyl-1,6-hexamethylene-diisocyanate; aliphatic (meth)acrylic acid esters such as, for example, 1,6-hexamethylene-dimethacrylate (1,6-HX), neopentylglycoldi(meth)acrylate, and trimethylolpropane-tri(meth)acrylate; polyethylene glycol-di(meth)acrylates (chain length n=less than 6) such as, for example, ethylene glycol-di(meth)acrylate, diethylene glycol-di(meth)acrylate, and triethylene glycoldi(meth)acrylate; and polypropylene glycoldi(meth)acrylates (chain number n=12 or less) such as, for example, propylene glycol-di(meth)acrylate, dipropylene glycoldi-(meth)acrylate, tripropylene glycoldi(meth)acrylate, and nanopropylene glycol-di(meth)acrylate. Components E) according to the invention comprise monomers that comprise at least one (meth-)acrylate group selected from methylmethacrylate, ethyl-methacrylate, propylmethacrylate, butylmethacrylate, n-hexylmethacrylate, 2-phenoxy-ethylmethacrylate, isobornylmethacrylate, isodecylmethacrylate, polypropylene glycol-mono-methacrylate, tetrahydrofuryl-methacrylate, polypropylen glycol-mono-methacrylate, methylacrylate, ethylene acrylate, propylacrylate, butylacrylate, n-hexylacrylate, 2-phenoxyethylacrylate, isobornylacrylate, isodecylacrylate, polypropylene glycol-mono-acrylate, tetrahydrofuryl-acrylate, hydroxyethylacrylate, hydroxypropylacrylate, hydroxyethyl-methacrylate, hydroxypropylmethacrylate or mixtures thereof or at least one cross-linker. Typical cross-linkers are BDMA, 1,4-butanediol-dimethacrylate (1,4-BDMA) or pentaerythritol-tetraacrylate, urethanedimethacrylate (UDMA), bis-GMA monomer (bisphenyl-A-glycidyl-methacrylat). The use of diluents (low viscosity acrylates such as triethylene glycoldimethacrylate (TEGDMA) and diethylene glycoldimethacrylate (DEGMA), etc.

Preferred (meth-)acrylates having at least two (meth-)acrylate groups are selected from ethanedioldimethacrylate, tetraethylene glycoldimethacrylate, diethylene glycol dimethacrylate, ethylene glycol dimethacrylate, polyethylene glycol dimethacrylate (400) or (600), butanedioldimethacrylate, hexanedioldimethacrylate, decanedioldimethacrylate, dodecanedioldimethacrylate, 1,3-butylene glycol dimethacrylate, dipropylglycolmethacrylate, bisphenol-A-dimethacrylate, bisphenol-A-dimethacrylate derivative such as ethoxylated 2-bisphenol-A-dimethacrylate, trimethylolpropane trimethacrylate, triethylene glycol dimethacrylate, 2,2-bis-4-(3-methacryloxy-2-hydroxy-propoxy)-phenyl propane (Bis-GMA), tricyclodecane dimethanoldimethacrylate, a urethanemethacrylate with at least two methacrylate groups or a mixture containing at least one of said (meth-)acrylates.

Preferred (meth-)acrylates with three to six (meth-)acrylate groups are selected from (i) with three (meth-)acrylate groups from ethoxylated (15)-trimethylolpropane-triacrylate, ethoxylated 5-pentaerythritoltriacrylate, propoxylated (5.5)-glyceryltriacrylate, trimethylol-propanetrimethacrylate, tris(2-hydroxyethyl)-isocyanurate-triacrylate, and/or (ii) with four (meth-)acrylate groups from di-tri methylolpropane-tetraacrylate, ethoxylated (4)-pentaerythritol-tetraacrylate, pentaerythritol-tetraacrylate, di-trimethylolpropane-tetramethacrylate, ethoxylated (4)-pentaerythritol-tetramethacrylate, pentaerythritol-tetramethacrylate and/or (iii) with five (meth-)acrylate groups from di-pentaerythritol-pentaacrylate, i-pentaerythritol-pentamethacrylate, dipentaerythritol pentaacrylate, di(tetramethylolmethane)-pentamethacrylate, and/or (iv) with six (meth-)acrylate groups a dipentaerythrit-hexa(meth)acrylate. Also well-suited are oligomers of (meth-)acrylates, in particular urethane-di-acrylate oligomer.

Another object of the invention is a kit comprising an applicator that comprises at least one further additive selected from metals, metal-containing compounds and organometallic compounds, in particular alkali hydroxide, alkaline earth hydroxide, aluminium hydroxide, zinc oxide, alkaline salts or alkaline earth salts of organic compounds.

Another object of the invention is the use of at least one additive selected from metals, metal-containing compounds, and organometallic compounds for affecting the adhesion of dental materials, whereby the additive is provided at or on an application aid by contacting the at least one additive to a polymerisable dental adhesive. Preferably, the polymerisable dental adhesive can be applied to a dental surface by means of the application aid.

Another subject matter of the invention is the use of at least one adhesive selected from metals, metal-containing compounds, and organometallic compounds for affecting the polymerisation, in particular the polymerisation of dental materials, such as dental adhesives, comprising at least one polymerisable monomer having an acid group in the molecule, preferably the radical polymerisation of dental materials, in particular containing monomers with an acid group, whereby the additive is provided at or on an application aid by contacting the at least one additive to a polymerisable dental adhesive.

The monomers for radical polymerisation having an acid group comprise (meth)acrylate(s) and/or olefinic urethane-based dental monomers.

The invention is illustrated in more detail in the following based on examples, without limiting it to said examples:

EXAMPLE 1

Nano-Platinum Micro-Applicator (Presently: Microbrushes®)

Impregnation of the Microbrush:

The micro-applicators (Microbrush; commercial, untreated) were suspended by their flocked side in the impregnation solution (nano-platinum suspension with a platinum content of 0.002%) for 24 h. The suspension was stirred during the impregnation to effect homogeneous distribution of the Pt particles.

Subsequently, the impregnated micro-applicators were dried in a heating cabinet at 37° C. for 24 h. The impregnation cannot be quantified by weighing with an analytical balance. However, the impregnation of the micro-applicators is evident by the clear grey colouration.

Test of the Efficacy of the Impregnated Micro-Applicators:

Test A) Tests of Adhesion Between Enamel and Composite (Shear Bond Strength, SBS)

Tooth substrate: Enamel; human tooth

Adhesive: Heraeus Kulzer GmbH iBOND® Self Etch

Composite: Heraeus Dental Venus® Diamond A2

Microbrush for application of the adhesive:
1. Untreated as a reference
2. Impregnated with nano-platinum solution Measuring procedure—SBS test on enamel: The adhesive was processed on polished enamel in accordance with the instructions for use. Subsequently, the composite was applied appropriately with a receiving device (Ultradent device, cf. EN ISO 29022) and polymerised such that a composite cylinder with a diameter of 2.38 mm was produced. After storage for 24 h at 37° C. in water, the test bodies were affixed in the Zwick Z010 universal testing machine using a test clamping device (cf. EN ISO 29022). The testing machine was controlled by a PC using the Zwick testXpert software. The test was done at an advancing rate of 1.0 mm+/−0.1 until the bond between tooth and composite cylinder fractured.

The force transferred to the measuring can during the test procedure was measured by the PC and registered as shear bond strength in MPa by the software.

Overview of the analysis of the data and results of the adhesion tests: A total of 2 series of measurements of iBOND® Self Etch with the nano-platinum microbrush and were compared to the reference iBOND® Self Etch with untreated micro-applicator. The adhesion tests yielded means of 29.3 MPa for the reference and 35.9 MPa and 36.0 MPa for the nano-platinum micro-applicator (Microbrush) tests.

SBS [MPa] iBOND® Self Etch on Enamel

|  | Reference untreated | Series of measurements with nano-platinum Micro-applicators | |
| --- | --- | --- | --- |
|  | Micro-applicators | Test 1 | Test 2 |
| Mean | 29.3 | 35.9 | 36.0 |
| Standard deviation | 1.8 | 7.6 | 1.8 |

The use of the nano-platinum-impregnated microbrush (micro-applicator) allows a significantly higher adhesion, mean of up to 23%, on enamel to be attained.

Test B: Polymerisation Turnover and/or Double Bond Turnover After Illumination

Adhesive: HeraeusDental iBOND® Self Etch
Composite: HeraeusDental Venus A2
Light unit: HeraeusTranslux Powerblue Microbrush for application of the adhesive:
1. Untreated as a reference
2. Impregnated with nano-platinum solution Measuring Procedure for the Double Bond Conversion Rate:

The conversion rate (percentage of converted double bonds) was determined using an FTIR-ATR Diamond Spectrometer (Spectrum One, Universal ATR Sample Accessory, Perkin Elmer).

The FTIR spectra were measured right away and 10 minutes after polymerisation of the adhesive and filling of a virtual cavity (filling covers the ATR crystal, h=1.6 mm) with the Venus composite. The conversion rate was calculated from the ratio of the absorption bands of the unpolymerised aliphatic carbon double bond (wavelength=1638 cm$^{-1}$) versus the polymerised carbon double bond.

The spectra were analysed by a derivative manner using the 2nd derivative with smoothing of points over the entire height of the aliphatic carbon double bond peak at 1638 cm$^{-1}$. The adhesive was applied to the ATR crystal with the untreated microbrush as the reference and the nano-platinum microbrush as follows: Two droplets of bonding were placed in a mixing bowl. The adhesive was stirred with the microbrush for 10 seconds and then applied in two aliquots to the ATR crystal. The solvent was evaporated for 15-20 seconds and then exposed to an air blower (5 bar) for 20 seconds such that a rigid film was formed.

The non-polymerised adhesive film was covered with a black hood for protection from light and the non-polymerised spectrum was recorded. A template h=1.6 mm was placed; the adhesive film over the ATR crystal was polymerised for 20 seconds. Then the Venus A2 composite was layered over the adhesive film, the composite was covered with a film (permeable to the activated radiation) and polymerisation took place for 20 seconds. A polymerised spectrum was recorded right away <immediately after illumination> and after 10 minutes.

Overview of the results of the determination of the adhesive conversion rate: The series of measurements of iBOND® Self Etch processed with the Nano-Platinum Microbrush® was compared to the reference iBOND® Self Etch with untreated Microbrush®. The conversion rates were determined right after the polymerisation and 10 minutes after the polymerisation as the mean of 5 measurements each.

Double Bond Conversion % of iBOND® Self Etch Right Right After Illumination

|  | Micro-applicator | Micro-applicators |
|---|---|---|
| Mean | 58.5 | 69.0 |
| Standard deviation | 3.1 | 5.2 |

The use of the nano-platinum-impregnated micro-applicators (Microbrush®) allows a clearly higher double bond conversion rate to be attained right after illumination.

Double Bond Conversion % of iBOND® Self Etch Right 10 Minutes After Illumination

|  | Reference untreated micro-applicators | Nano-platinum micro-applicators |
|---|---|---|
| Mean | 63.8 | 74.9 |
| Standard deviation | 3.0 | 4.6 |

The use of the nano-platinum-impregnated micro-applicators allows a significantly higher double bond conversion rate to be attained.

EXAMPLE 2

Basic Micro-Applicators (Microbrushes®)

The low pH value of all-in-one adhesives prevents the bonding of self-curing materials partially or even completely. For this reason, the adhesive should use alkaline-impregnated MBs to be capable of conditioning enamel/dentine for a period of time in order to be neutral and/or less acidic during the application time of 20 seconds and enable the bonding of self-curing materials.

Micro-applicators (Microbrush) impregnated with Ca(OH)$_2$ solution were produced and used to apply the iBOND Self Etch adhesive.

Production of impregnated micro-applicators (20 Microbrush): A total of 50 ml 15% aqueous calcium hydroxide solution (calcium hydroxide in water pa.=slightly saturated solution) was produced and the flocked part of the micro-applicators (Microbrush®, brush) was dipped in the solution for 1 h while stirring. Then followed a drying process for 24 h in a heating cabinet at 37° C., the parts were suspended for drying. The handles of the micro-applicators were cleaned.

The efficacy was tested by measuring the pH value as a function of the contact time with the adhesive. For this purpose, the pH value of the adhesive was determined before contact with the impregnated micro-applicators as well as after 1 second, 10 seconds and 20 seconds. As a control, the pH value was determined after 10 and 20 seconds of contact time with untreated micro-applicators (Microbrush®). According to the instructions for use, iBOND Self Etch is to be massaged into the hard substance of the tooth with a micro-applicator for 20 s such that these time windows are representative of the actual application time.

Devices/materials: WTW Microprocessor pH ION Meter; Schott Instruments Electrode blue Line 16 pH SN Al 15010019 (for small volumes) Centrifuge vial 1.7 ml; Adhesive: iBOND Self Etch; Microbrush® with Ca(OH)$_2$; Microbrush® untreated.

Measuring procedure: Placement of 40 droplets of adhesive. Measurement of the pH value: Successively dip 10 MB (micro-applicator; microbrush) for 1 second (keep MBs), measure pH value for the contact time of 1 second The same MBs were then dipped into the adhesive for another 9 s while stirring (keep MBs). The pH value for the contact time of 10 s was measured. The same MBs were then dipped into the adhesive for another 10 s while stirring. The pH value for the contact time of 20 seconds was measured.

| Contact time | Ca(OH)$_2$-MB pH value | Reference untreated MB pH value |
|---|---|---|
| Without | 1.55 | 1.55 |
| 1 second | 1.64 | — |
| 10 seconds | 1.92 | 1.54 |
| 20 seconds | 2.00 | 1.56 |

The use of the calcium hydroxide-impregnated micro-applicators allows a delaying effect on the pH value to be attained. The pH value can be increased significantly within the time window of the application of adhesive.

The invention claimed is:

1. Dental micro-applicator comprising (a) a body with a distal and a proximal end and (b) an application aid on the proximal end, wherein the applicator comprises a rod-shaped and solid material body, wherein the application aid comprises, at least in part, at least one additive selected from the group consisting of metals, metal-containing compounds, and organometallic compounds for affecting the polymerisation of dental materials, wherein the at least one additive comprises catalytically active platinum in form of platinum sponge, wherein the application aid is impregnated, at least in part, with nano-particulate platinum, wherein the nano-particulate platinum has a particle size of less than or equal to 10 nm, and wherein the nano-particulate platinum is platinum sponge.

2. Applicator according to claim 1, wherein the at least one additive is present in nano-particulate form, optionally having a particle size of less than or equal to 500 nm to more than or equal to 1 nm.

3. Applicator according to claim 1, wherein the body consists of an inert polymer selected from thermoplastic polymers comprising PE, PP, HDPE, LDPE, porous expanded polypropylene (PEPP) and/or expanded polypropylene (EPP).

4. Applicator according to claim 1, wherein the application aid on the proximal end of the body comprises at least one a) filament, brush, sponge, flakes, comb, ball, paintbrush, spatula, mixing pad and/or porous means.

5. Applicator according to claim 1, wherein the application aid is provided with at least one catalytically active metal or at least one catalytically active organometallic compound.

6. Applicator according to claim 1, wherein the application aid is provided with at least one catalytically active metal or at least one catalytically active organometallic compound, whereby the catalytically active metal is selected from iron, cobalt, nickel, ruthenium, rhodium, palladium, osmium, iridium, platinum, silver and copper, tin and zinc.

7. Applicator according to claim 1, wherein the applicator additionally comprises an excipient, activator and/or at least one further additive, whereby the excipient comprises carboxylic acid, salt of a carboxylic acid, buffer, hygroscopic compounds and/or the at least one further additive is selected from base and bases-releasing compounds.

8. Applicator according to claim 1, wherein the at least one additive is selected from the group consisting of said metal-containing compounds, and the metal containing compounds are selected from alkaline salts, alkaline earth salts, inorganic salts of alkali metals, inorganic salts of alkaline earth metals, alkali metal hydroxides, alkaline earth metal hydroxides, organic alkaline salts, organic alkaline earth salts, basic metal oxides, base-forming agents, and metal-containing buffers.

9. Applicator according to claim 1, wherein the at least one additive is at least one metal-containing compound selected from alkali metal hydroxides, alkaline earth metal hydroxides, alkaline earth oxides, and salts of carboxylic acids.

10. Method for producing a dental micro-applicator according to claim 1, comprising:
(i) providing a dental micro-applicator having a body with a distal and a proximal end with an application aid on the proximal end, wherein the applicator comprises a rod-shaped and solid material body; and
(ii) contacting the application aid with at least one additive selected from metals, metal-containing compounds, and organometallic compounds for affecting the polymerisation of dental materials, wherein the at least one additive comprises catalytically active platinum in form of platinum sponge, wherein the application aid is impregnated, at least in part, with nano-particulate platinum, wherein the nano-particulate platinum has a particle size of less than or equal to 10 nm, and wherein the nano-particulate platinum is platinum sponge.

11. Method according to claim 10, which further comprises:
(Ii) providing the at least one additive in a suspension, dispersion, paste, solution or in the form of a powder.

12. Method according to claim 10, which further comprises
(ii) contacting the application aid to a nano-particulate additive.

13. Method according to claim 12, wherein the nano-particulate additive is at least one metal selected from catalytically active metals and a metal compound showing an alkaline reaction.

14. Method according to claim 10, wherein the metal is present in a suspension and said suspension comprises, in addition, an excipient, an activator and/or a further additive, whereby the excipient comprises at least one carboxylic acid, salt of a carboxylic acid, buffer and/or base.

15. Method according to claim 14, wherein the content of the metal in the suspension based on the total composition of the suspension is 1.0 to $1.0 \cdot 10^{-8}$% by weight.

16. Kit comprising a) an applicator according to claim 1, and b) a dental adhesive.

17. Kit according to claim 16, wherein a) the applicator comprises platinum as additive.

18. Kit according to claim 16, wherein the dental adhesive comprises A) a radically polymerisable monomer having an acid group in the molecule, B1) optionally, a photo-sensitiser and/or, optionally, B2) a peroxide, C) a water-miscible solvent, and D) water.

19. Kit according to claim 16, which further comprises E) at least one radically polymerisable monomer without an acid group.

20. Kit according to claim 16, wherein the at least one additive selected from the group consisting of said metal-containing compounds, and said metal-containing compounds are selected from the group consisting of alkali hydroxide, alkaline earth hydroxide, aluminium hydroxide, zinc oxide, and organometallic compounds, alkaline salts or alkaline earth salts of organic compounds.

21. Method of affecting the polymerization of a dental material, the method comprising providing at least one additive selected from metals, metal-containing compounds, and organometallic compounds at or on an application aid by contacting the at least one additive to a polymerizable dental adhesive, wherein the at least one additive comprises as the at least one additive catalytically active platinum in form of platinum sponge, wherein the application aid is impregnated, at least in part, with nano-particulate platinum, wherein the nano-particulate platinum has a particle size of less than or equal to 10 nm, and wherein the nano-particulate platinum is platinum sponge.

22. Method according to claim 21, wherein the polymerisable dental adhesive is applied to a dental surface by means of the application aid.

23. Method according to claim 21, wherein the polymerization which is affected is a radical polymerization of dental materials.

* * * * *